United States Patent
Steinkohl et al.

(10) Patent No.: US 12,451,695 B2
(45) Date of Patent: Oct. 21, 2025

(54) METHODS AND SYSTEMS FOR IMPROVING CONTROL OF A RENEWABLE ENERGY POWER PLANT

(71) Applicant: VESTAS WIND SYSTEMS A/S, Aarhus N (DK)

(72) Inventors: Joachim Steinkohl, Aarhus C (DK); Henrik Møller, Egå (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/807,541

(22) Filed: Aug. 16, 2024

(65) Prior Publication Data

US 2025/0253660 A1    Aug. 7, 2025

(30) Foreign Application Priority Data

Feb. 7, 2024 (DK) .............................. PA202430063

(51) Int. Cl.
  *H02J 3/18* (2006.01)
  *H02J 3/38* (2006.01)

(52) U.S. Cl.
  CPC ............ *H02J 3/1892* (2013.01); *H02J 3/381* (2013.01); *H02J 2300/28* (2020.01)

(58) Field of Classification Search
  CPC ....... H02J 3/1892; H02J 3/381; H02J 2300/28
  See application file for complete search history.

(56) References Cited

U.S. PATENT DOCUMENTS

2015/0061290 A1* 3/2015 Larsen ...................... F03D 7/04
                                                                  290/44
2021/0242685 A1* 8/2021 Godridge ................. H02K 3/28
(Continued)

FOREIGN PATENT DOCUMENTS

| CN | 102299527 A | 12/2011 |
| EP | 3002453 A1 | 4/2016 |
| WO | 2023123686 A1 | 7/2023 |

OTHER PUBLICATIONS

English translation of WO2023123686A1. (Year: 2023).*
(Continued)

*Primary Examiner* — Sean Gugger
(74) *Attorney, Agent, or Firm* — Patterson + Sheridan, LLP; Gero G. McClellan (57) ABSTRACT

A power plant controller for a renewable energy power plant comprising a plurality of renewable energy generators is configured to: receive a signal indicative of a voltage level of the power network to which the power plant is connected; receive a plurality of signals from the plurality of renewable energy generators, each signal being indicative of a voltage level of a respective renewable energy generator; and determine, for each of the plurality of renewable energy generators, a respective reactive power set point based on: the indicated voltage level of the power network; the indicated voltage level of that renewable energy generator; and a reference voltage level based on the indicated voltage levels of the plurality of renewable energy generators; and dispatch each determined reactive power set point to a respective local controller associated with the respective renewable energy generator for controlling that renewable energy generator.

14 Claims, 4 Drawing Sheets

(56) References Cited

U.S. PATENT DOCUMENTS

2023/0178988 A1    6/2023  Lund et al.
2023/0291204 A1    9/2023  Yin et al.

OTHER PUBLICATIONS

Danish Patent and Trademark Office, 1st Technical Examination including the Search Report for Application PA 2024 30063 dated Jul. 29, 2024.
Extended European Search Report for EP Application No. 25152866.7 dated Aug. 4, 2025.

\* cited by examiner

METHODS AND SYSTEMS FOR IMPROVING CONTROL OF A RENEWABLE ENERGY POWER PLANT

TECHNICAL FIELD

The present disclosure relates to methods and systems for improving control of a renewable energy power plant connected to a power network.

BACKGROUND

Regulators and operators of power networks expect connected power plants to adhere to a 'grid code' and to provide particular services to the power network. For example, some operators require power plants to support the power network when the voltage level of the power network deviates from a normal operational range or a permissible range around a nominal voltage value.

For example, a lower threshold may be, for example, in a range from about-5% to about-20% and an upper threshold may be, for example in a range from about +5% to about +20% of the nominal voltage. For example, in a 110 KV network the normal operating range may be between 96 and 123 kV, in a 220 kV network it may be between 193 and 245 kV, and in a 380 kV network it may be between 350 and 420 kV.

In order to support the power network, the power plant controller may provide reference values (i.e. target values or "set points") for one or more electric-production parameters, such as the active power, and/or the reactive power, to be produced by the individual renewable energy generators of the power plant. These reference values or setpoints may be dispatched to local controllers, associated with respective ones of the renewable energy generators, that operate the generators to implement the set points received from the power plant controller. For example, the power plant controller may provide reactive power reference values that the individual renewable energy generators use to support the power network by consuming or injecting reactive power accordingly.

Conventional dispatching strategies balance the reactive power demand of the power network between the renewable energy generators to provide equal current in the feeder system cables that connect the generators together in the power plant.

However, such dispatching strategies can cause voltage deviations between the different generators and significant voltage distortion. It is an aim of the present invention to address one or more of the disadvantages associated with the prior art.

SUMMARY OF THE INVENTION

According to an aspect of the invention, there is provided a power plant controller for a renewable energy power plant comprising a plurality of renewable energy generators. The renewable energy power plant is connected to a power network and the power plant controller is configured to execute machine readable instructions to: receive a signal indicative of a voltage level of the power network to which the power plant is connected; determine a reactive power reference value for each renewable energy generator based on the indicated voltage level of the power network; receive a plurality of signals from the plurality of renewable energy generators, each signal being indicative of a voltage level of a respective renewable energy generator; and for each of the plurality of renewable energy generators: determine a reactive power adjustment, based on the difference between the indicated voltage level of that renewable energy generator and a reference voltage level based on the indicated voltage levels of the plurality of renewable energy generators; determine a reactive power set point based on the reactive power reference value, and the reactive power adjustment, determined for that renewable energy generator; and dispatch that determined reactive power set point to a local controller associated with that renewable energy generator for controlling the renewable energy generator.

According to another aspect of the invention, there is provided a power plant controller for a renewable energy power plant comprising a plurality of renewable energy generators. The renewable energy power plant is connected to a power network and the power plant controller is configured to execute machine readable instructions to: receive a signal indicative of a voltage level of the power network to which the power plant is connected; receive a plurality of signals from the plurality of renewable energy generators, each signal being indicative of a voltage level of a respective renewable energy generator; determine, for each of the plurality of renewable energy generators, a respective reactive power set point, the reactive power set point being determined based on: the indicated voltage level of the power network; the indicated voltage level of that renewable energy generator; and a reference voltage level based on the indicated voltage levels of the plurality of renewable energy generators; and dispatch each determined reactive power set point to a respective local controller associated with the respective renewable energy generator for controlling that renewable energy generator.

In this manner, the power plant controller is advantageously configured to determine reactive power set points that account for the voltage level of the power network, whilst also accounting for the individual local voltage levels of the generators and how such voltage levels vary amongst the power plant. The power plant controller is therefore able to improve the balance of voltage levels across the power plant, providing improved voltage headroom, in addition to reducing voltage distortion and feeder system losses.

In an example, the power plant controller is configured to determine the reactive power set points by: determining a reactive power reference value for each renewable energy generator based on the indicated voltage level of the power network; and for each of the plurality of renewable energy generators: determining a reactive power adjustment based on the difference between the indicated voltage level of that renewable energy generator and the reference voltage level; and determining the reactive power set point based on the reactive power reference value, and the reactive power adjustment, determined for that renewable energy generator.

In this manner, the power plant controller is advantageously configured to determine reactive power set points that collectively satisfy an overall reactive power demand of the power plant, whilst also setting the individual reactive power set points appropriately for the respective renewable energy generators to account for the relative local voltage levels amongst the generators.

In an example, the reactive power adjustment is determined for each renewable energy generator using a droop control technique. The droop control technique provides a reliable relationship between the input and output parameters. That is, the droop control technique may define the reactive power adjustment as a function of the difference between the indicated voltage level of the renewable energy generator from the reference voltage level. For example, the droop control technique may define the relationship as a linear function, where a droop coefficient of the function defines a slope of the linear relationship. In examples, the droop coefficient may be a fixed value or a variable value, that may be updated in real-time based on fluctuations in the indicated local voltage level of the renewable energy generator.

In an example, the reactive power adjustment is determined using the equation:

$$\Delta Q_i = (V_{REF\_WTG} - V\_WTG_i) \times \text{Droop}$$

where $\Delta Q_i$ is the reactive power adjustment for the i-th renewable energy generator, i=1 to N, where N is a positive integer corresponding to the number of renewable energy generators in the power plant, $V_{REF\_WTG}$ is the reference voltage level, $V\_WTG_i$ is the indicated voltage level of the i-th renewable energy generator, and Droop is a droop coefficient of the droop control technique (relating the determined voltage difference to a corresponding reactive power adjustment, for example having the units VAR/V). The droop coefficient, Droop, may be the same for each renewable energy generator in order to ensure that the sum of the reactive power adjustments, $\Sigma_1^N \Delta Qi$, is equal to zero.

In an example, the power plant controller is configured to determine the droop coefficient, Droop, for the plurality of renewable energy generators as a function of an electric-power parameter of the renewable energy power plant. For example, the power plant controller may determine the droop coefficient, Droop, using a look-up table storing predetermined values of the droop coefficient, Droop, for respective values of the electric-power parameter of the power plant. In this manner, the droop coefficient is advantageously adaptable to the power plant conditions for improved reactive power regulation.

In an example, the power plant controller is configured to limit each determined reactive power adjustment using an upper power limit and/or a lower power limit. In this manner, the power plant controller alleviates the load demands of the renewable energy generators, mitigating the risk of damage.

In an example, the power plant controller is configured to limit a rate of change of the determined reactive power adjustment using a rate of change limit.

In an example, the reactive power reference value is determined for each renewable energy generator by: determining a reactive power reference value for the renewable energy power plant based on the indicated voltage level of the power network; and dividing that reactive power reference value amongst the plurality of renewable energy generators to determine an individual reactive power reference value for each renewable energy generator.

In an example, the reference voltage level is determined as an average voltage level of the indicated voltage levels of the plurality of renewable energy generators.

In an example, the power plant controller is configured to limit the reference voltage level using an upper voltage limit and/or a lower voltage limit.

In this manner, the power plant controller mitigates the effects of anomalous voltage levels and reduces the risk of damage to the renewable energy generators.

In an example, the power plant controller is configured to limit a rate of change of the reference voltage level using a rate of change limit.

In an example, the plurality of signals received from the plurality of renewable energy generators are each indicative of the voltage level of the respective renewable energy generator at one or more of: a low voltage side of a transformer of the renewable energy generator, the transformer connecting the renewable energy generator to the power plant; a high voltage side of the transformer; and/or at respective terminals of a power converter of the renewable energy generator.

In an example, the power plant controller is configured to determine each reactive power set point based, at least in part, on the reference voltage level and the indicated voltage level of the respective renewable energy generator, in dependence on detecting one of a plurality of plant operating conditions.

In an example, the plurality of plant operating conditions include: an active or reactive power output of the power plant being greater than or equal to an upper power threshold; an active or reactive power output of the power plant being less than or equal to a lower power threshold; the indicated voltage level of the power network being greater than or equal to an upper voltage threshold; and/or the indicated voltage level of the power network being less than or equal to a lower voltage threshold.

According to yet another aspect of the invention, there is provided a method of operating a renewable energy power plant connected to a power network. The renewable energy power plant comprises a plurality of renewable energy generators and the method comprises: obtaining a signal indicative of a voltage level of the power network to which the power plant is connected; obtaining a plurality of signals from the plurality of renewable energy generators, each signal being indicative of a voltage level of a respective renewable energy generator; determining, for each of the plurality of renewable energy generators, a respective reactive power set point based on: the indicated voltage level of the power network; the indicated voltage level of that renewable energy generator; and a reference voltage level based on the indicated voltage levels of the plurality of renewable energy generators; and dispatching the determined reactive power set point from a power plant controller to a local controller associated with that renewable energy generator for controlling the renewable energy generator.

According to a further aspect of the invention, there is provided a method of operating a renewable energy power plant connected to a power network. The renewable energy power plant comprises a plurality of renewable energy generators and the provided method comprises: obtaining a signal indicative of a voltage level of the power network to which the power plant is connected; determining a reactive power reference value for each renewable energy generator based on the indicated voltage level of the power network; obtaining a plurality of signals from the plurality of renewable energy generators, each signal being indicative of a voltage level of a respective renewable energy generator; and for each of the plurality of renewable energy generators: determining a reactive power adjustment based on the difference between the indicated voltage level of that renewable energy generator and a reference voltage level based on the indicated voltage levels of the plurality of renewable energy generators; determining a reactive power set point based on the reactive power reference value, and the reactive power adjustment, determined for that renewable energy generator; and dispatching that determined reactive power set point from a power plant controller to a local controller associated with that renewable energy generator for controlling the renewable energy generator.

Within the scope of this invention it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Embodiments of the present invention relate to methods and systems for improving control of a renewable energy power plant, particularly in relation to providing voltage support to a power network.

This is achieved by way of determining individual reactive power set points for the renewable energy generators based on indicated voltage levels of the power network and the local voltage levels at the respective generators. In particular, a central power plant controller is configured to receive signals indicative of the voltage level of the power network and the local voltage levels of the individual renewable energy generators and determine a respective reactive power set point for each renewable energy generator based on:

(i) the indicated voltage level of the power network,
(ii) the indicated voltage level of that renewable energy generator, and
(iii) a reference voltage level based on the indicated voltage levels of the plurality of renewable energy generators.

To give an example, the power plant controller may determine a total reactive power demand (or reference value) for the renewable energy power plant to support the power network based on the indicated voltage level of the power network. For example, the power plant controller may include a closed loop controller for determining the reactive power demand based on feedback measurements of the reactive power output of the power plant and the indicated voltage level of the power network, for comparison with respective reference values that may be received as external inputs from a grid operator, for example. The overall reactive power demand may then be split into individual reactive power reference values (or setpoints) for the individual renewable energy generators. For example, individual reactive power reference values may be determined by dividing the overall reactive power reference demand equally amongst the generators or otherwise distributing the reactive power reference demand amongst the generators, for example according to the abilities or available power of the individual generators. Advantageously, in order to minimise power losses in the power plant, the central power plant controller may further adjust each of the initial reactive power reference values based on the local voltage levels of the respective generators. In particular, the central power plant controller may determine, for each renewable energy generator, a respective reactive power set point by adjusting the initially determined reactive power reference value based on the local voltage level. For example, the power plant controller may be configured to adjust each initial reactive power reference value based on the deviation, in each case, of the respective local voltage level from a reference voltage level for the generators, where the reference voltage level is advantageously based on the local voltage levels itself. For example, the reference voltage level may be an average voltage level of the renewable energy generators.

The determined reactive power set points are then dispatched to respective local controllers that control the respective renewable energy generators accordingly to support the network voltage.

In this manner, it is envisaged that embodiments of the invention will provide more balanced voltage outputs from the generators, reducing losses in the feeder systems, and providing more voltage headroom or capacity for improved control reliability in the event of a grid fault.

Figure 1:
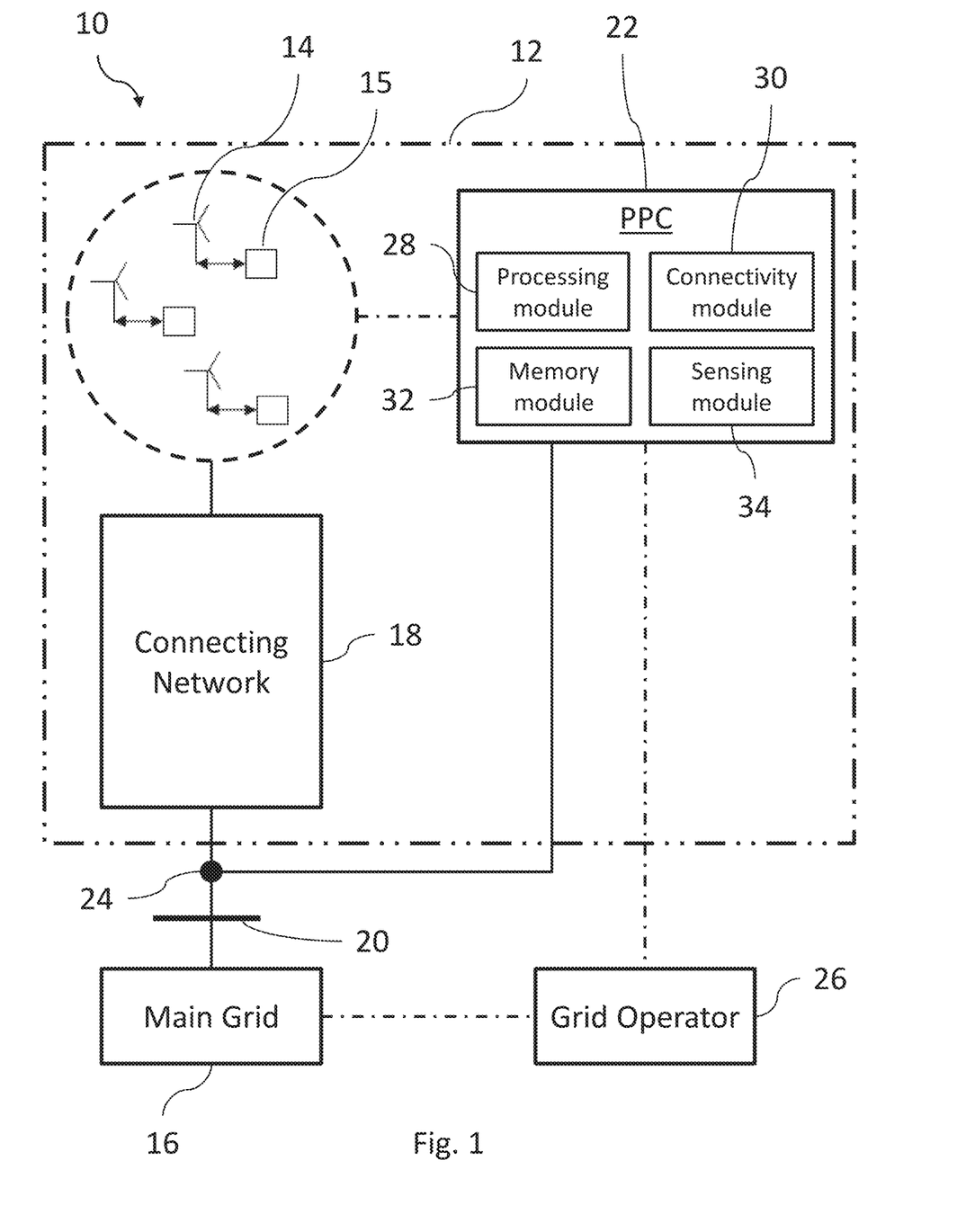
FIG. 1 schematically shows a power network connected to a renewable energy power plant that includes a power plant controller.

FIG. 1 illustrates a typical architecture in which a renewable energy power plant is connected to a main grid or wider power network. In the example shown in FIG. 1, the renewable energy power plant is a wind power plant (WPP). As will be understood by the skilled reader, a WPP comprises a plurality of wind turbine generators (WTG)s. A WTG is commonly referred to as a 'wind turbine'. The example shown is representative only and the skilled reader will appreciate that other specific architectures are possible. In other examples, the power plant may include other renewable energy sources such as a solar power plant, a bio energy power plant, an ocean/wave/tidal energy plant, or a hybrid power plant having a combination of different types of renewable energy power plants. Thus, the invention relates to renewable energy power plants and renewable energy generators in general, rather than being specific to wind power plants and generators as in the Figures. The components of the wind power plant and power network are conventional and as such would be familiar to the skilled reader. It is expected that other known components may be incorporated in addition, or as alternatives, to the components shown and described in FIG. 1. Such changes would be within the capabilities of the skilled person.

FIG. 1 shows a power system 10 incorporating a WPP 12. In this example, the WPP 12 includes a plurality of WTGs 14. Each of the plurality of WTGs 14 converts wind energy into electrical energy, which is transferred from the WPP 12 to a main power network, or 'main grid' 16, as active power and/or current, for distribution.

Although not illustrated in FIG. 1, the WPP 12 also includes compensation equipment, such as a static synchronous compensator (STATCOM) or another type of synchronous compensator, configured to provide reactive power or reactive current support as required.

The WPP 12 also includes a connecting network 18 for connecting the WPP 12 to the main grid 16. Although not shown in FIG. 1, the WTGs 14 may be connected together in the WPP 12 by respective feeder lines/systems that connect to one or more substations or collection points of the WPP 12. Such substations or collection points may therefore from part of the connecting network 18, where the power outputs from the WTGs 14 are combined, and the connecting network 18 may further include one or more transmission lines connecting the substations/distribution points to the main grid 16. The power generated by each WTG 14 may therefore be transmitted, via the respective feeder system, to the one of the substation or distribution point(s) and, in turn, to the main grid 16, via the transmission line(s).

In this example, the WPP 12 and the main grid 16 are connected at a Point of Interconnection (PoI) 20, which is an interface between the WPP 12 (or the transmission line(s) thereof) and the main grid 16. The PoI 20 may also be referred to as the Point of Common Coupling, which may be abbreviated to 'PCC' or 'PoCC'.

The WPP 12 further includes a power plant controller 22, referred to hereafter as PPC 22, for centralised control of the WTGs 14, and each of the WTGs 14 is associated with a respective local WTG controller 15. As will be understood by the skilled person, the WTG controllers 15 can be considered to be local control systems capable of operating a WTG 14 in the manner prescribed herein, and may comprise multiple control modules that control individual components of the WTG or just a single controller with multiple sub-modules (as shall be described in the following examples). The computer system of the WTG controllers 15 may operate according to software downloaded via a communications network or programmed onto it from a computer-readable storage medium.

Although each WTG 14 is associated with a respective local WTG controller 15 in this example, such an arrangement is not intended to be limiting on the scope of the invention.

In other implementations, a set of WTGs may share a single, semi-centralised WTG controller, for example, such that there are fewer WTG controllers than WTGs.

In any case, a bi-directional control network may be arranged between the PPC 22 and the WTG controllers 15 enabling two-way communication. For example, the uplink direction (i.e. the direction from the central PPC 22 to the local WTG controllers 15) is used to send reference values, e.g., for voltage and/or reactive power, from the PPC 22 to the local WTG controllers 15. The downlink direction may be used by the WTGs 15 to return information about their current operational state, e.g. about the amount of reactive power currently produced and/or a local voltage level, to the central PPC 22. Such a control network may, for example, be implemented as a bus system, i.e. a CAN bus (ISO 11898) or an Ethernet bus (IEEE 802.3).

The role of the PPC 22 is to provide centralised control of the WTGs 14 and to act as a command and control interface between the WPP 12 and the grid 16 (more specifically, a grid operator 26). For example, the grid operator 26 may be a transmission system operator (TSO) or a distribution system operator (DSO).

The PPC 22 is configured to generate and send dispatch signals to the WTG controllers 15. The dispatched signals contain active and reactive current, and/or power, set points determined by the PPC 22 to provide frequency and voltage support to the main grid 16 based on measurements of the power characteristics of the WTGs 14, the WPP 12 and/or the main grid 16.

In turn, the WTG controllers 15 control the WTGs 14 according to the set points contained within the dispatch signals and, in this manner, the WPP 12 is capable of altering its power or current output in reaction to set points received from the PPC 22.

For this purpose, the Power Plant Controller (PPC) 22 is connected to the main grid 16 at a Point of Measurement (PoM) 24, such as a power meter. For example, the PPC 22 may be configured to receive one or more measurement signals from the PoM 24 comprising measurements of the power supply from the WPP 12 to the main grid 16 and/or a frequency level of the main grid 16.

The PPC 22 is a suitable computer system for carrying out the controls and commands as described herein and so may incorporate a processing module 28, a connectivity module 30, a memory module 32 and a sensing module 34, amongst others, as shown in FIG. 1.

The connectivity module 30, the memory module 32, and/or the sensing module 34 are configured to provide the processing module 28 with information that is indicative of a frequency level of the main grid 16, as well as power levels, current levels, and/or voltage levels, of the WTGs 14 and/or the WPP 12.

For example, the sensing module 34 may receive such information directly from one or more connected sensors or power meters (e.g. at the PoM 24) and communicate the information to the processing module 28. Alternatively, or additionally, the information may be determined by one or more systems that are connected to the connectivity module 30, such as the WTG controllers 15, and the information may be communicated, in turn, through the connectivity module 30 to the processing module 28. In each case, the determined information may be stored permanently, or temporarily, in the memory module 32, from which it may be recalled, on demand, by the processing module 28. The PPC 22 may also receive information regarding the grid 16 and/or local buses, substations and networks from an energy management system (not shown).

The PPC 22 and the local WTG controllers 15 may therefore each be arranged to work in a feedback mode in which they compare reference values, e.g. from reference inputs, with measured values, e.g. from measurement inputs, and produce control signals or references based on the difference between the input values.

However, in contrast to conventional arrangements, the PPC 22 is configured to determine and dispatch reactive power set points to the WTG controllers 15 based on both the voltage level of the main grid 16 and the local voltage levels of the individual WTGs 14. In this manner, the PPC 22 is configured to use the local voltage levels to determine individualised reactive power set points for controlling each of the WTGs 14, better distributing the voltage levels amongst the WTGs 14, whilst satisfying the reactive power demand of the main grid 16.

An exemplary control structure in accordance with an embodiment of the invention shall now be described in more detail with additional reference to FIG. 2.

Figure 2:
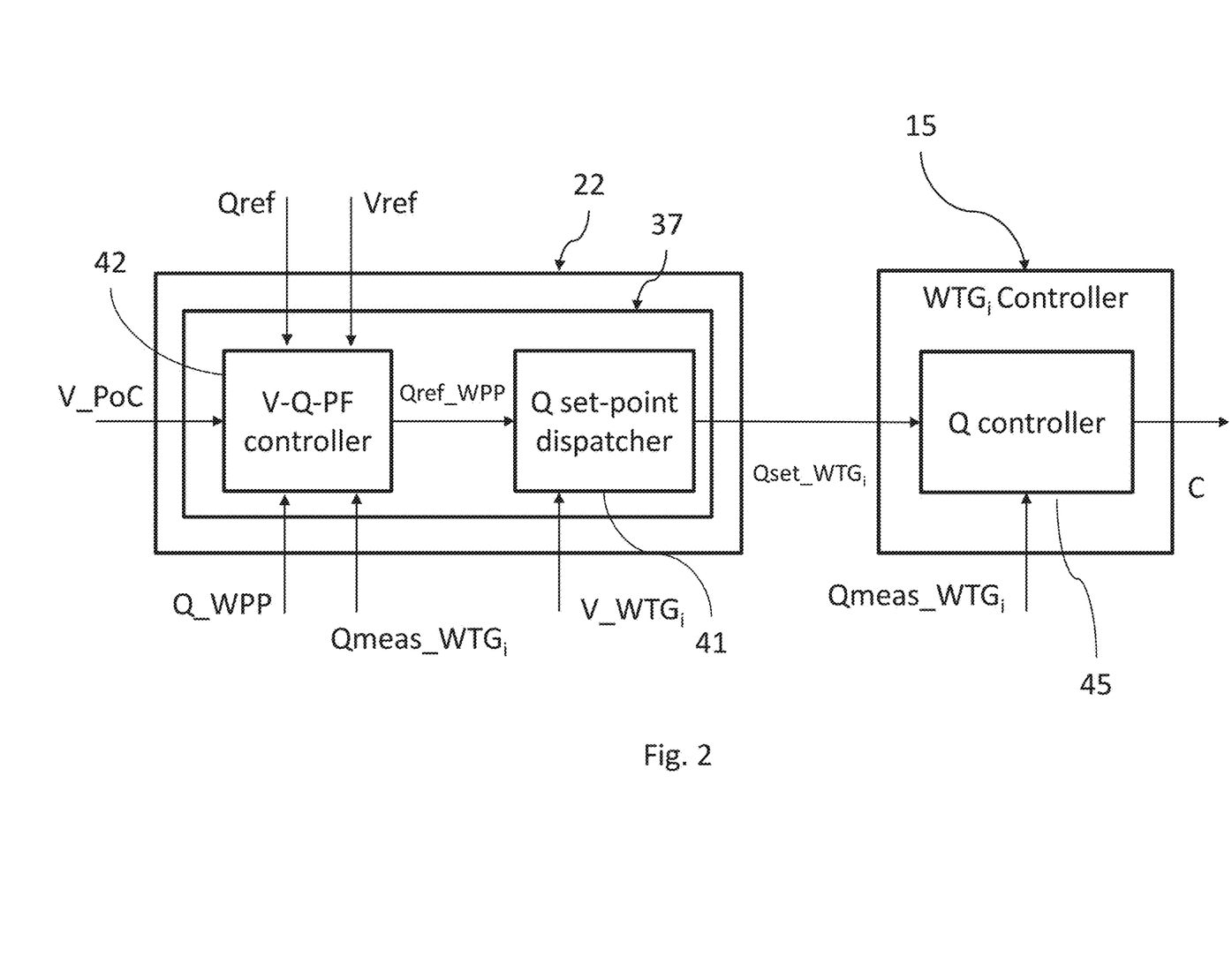
FIG. 2 shows an exemplary control structure of the power plant of FIG. 1.

As shown in FIG. 2, the overall controller structure of the WPP 12 comprises the central PPC 22 and the local WTG controllers 15. For simplicity, a single WTG controller 15 is shown in FIG. 2, but it shall be appreciated that the PPC 22 connects to each local WTG controller 15 in a substantially identical manner. The central PPC 22 and the local WTG controllers 15 each include both reactive-power and active-power controllers, however the following description is limited to aspects of reactive power control to avoid obscuring the invention, and so only reactive power controllers are shown in FIG. 2.

The PPC 22 is shown to receive, amongst other inputs, a voltage signal, V_PoC, indicative of a voltage level of the main grid 16. For example, the PPC 22 may receive a series of time-varying measurements indicative of the voltage level at the PoM 24, which may be used to derive the voltage signal, V_PoC.

The voltage signal, V_PoC, is provided as an input to a reactive-power controller 37 (i.e., Q controller 37) of the PPC 22, where the voltage signal, V_PoC, is used to regulate the reactive power of the grid 16.

For this purpose, the Q controller 37 receives signals that are relevant for reactive power control, such as the voltage signal, V_PoC, and a feedback signal, Q_WPP, indicative of the reactive power output from the WPP 12 to the main grid 16. The Q controller 37 also receives WTG feedback signals from the individual WTGs. For example, the WTG feedback signals may include signals indicative of the reactive power output and voltage of each WTG 14. That is, the WTG feedback signals may include:

(i) a local power signal, $Qmeas\_WTG_i$, indicative of the reactive power output of each $WTG_i$; and
(ii) a local voltage signal, $V\_WTG_i$, indicative of the voltage level of each $WTG_i$;

where i=1 to N and N is a positive integer corresponding to the number of WTGs 14 in the WPP 12.

The Q controller 37 is configured to determine individual reactive power set points for dispatch to the respective WTG controllers 15. That is, the Q controller 37 is configured to determine a reactive power set point, $Qset\_WTG_i$, for each WTG 14. For this purpose, the Q controller 37 may include one or more reactive power control loops for determining the reactive power set points, $Qset\_WTG_i$, based on such inputs, as shall be described in more detail.

In examples, the Q controller 37 may also receive external control inputs for reactive power, Qref, and/or voltage, Vref, control to be achieved at the PoM 24, and/or one or more parameters of a droop function used in the Q controller 37. Such parameters may include a slope or droop coefficient defining the mapping of a measured voltage to a reactive power to be produced, for example in units of VAR/V.

As indicated at the outset, the notion of "reactive power" includes other related parameters, such as reactive current, power factor, etc. Therefore, the reactive power set points, $Qset\_WTG_i$, may also indicate an amount of reactive current to be produced by the respective WTGs 14. Thus, the WTGs 14 and/or the STATCOM may also be commanded with reactive-current setpoints instead of reactive-power (and, optionally, active-power) setpoints.

As shown in FIG. 2, in this non-limiting example, the Q controller 37 comprises a V-Q-PF controller 40 and a Q set-point dispatcher 41. The V-Q-PF controller 40 produces an internal overall reference value, Qref_WPP, for the reactive power to be produced by the WPP 12, based on the inputs to the Q controller 36. "V" stands for voltage, "Q" for reactive power, and "PF" for power factor; "V-Q-PF" thereby indicates that the V-Q-PF controller 40 is enabled to receive V, Q, and/or PF, as an external reference, and to produce the internal reference value, Qref_WPP, based on such external references. For example, when the voltage signal, V_PoC, is above a voltage threshold, the V-Q-PF controller 40 may generate a reduced value of Qref_WPP. For this purpose, the V-Q-PF 40 may also include one or more droop functions or look-up tables for determining a prescribed reactive power level of the WPP 12 for the respective grid voltage level, and/or pre-determined ramp rates for increasing or decreasing the reactive power level. In particular, the look-up table may include a Reactive Power-voltage (Q-V) curve relating the grid voltage level to a respective reactive power demand of the WPP 12, which may then be used in the power control loops to determine the internal reference value, Qref_WPP.

The Q set point dispatcher 41 uses the overall reactive power reference, Qref_WPP, to determine individual reactive power setpoints, $Qset\_WTG_i$, for each of the local WTG controllers 15, and the STATCOM controller 33, if applicable.

For the sake of simplicity, the subsequent description only refers to the determination of the individual reactive power setpoints, $Qset\_WTG_i$, for each of the local WTG controllers 15. However, it shall be appreciated that further reactive power setpoints may be determined for the STATCOM controller 33, if applicable, in a substantially identical manner, the STATCOM controller 33 effectively being considered as an additional local WTG controller 15.

The Q set point dispatcher 41 is configured to split the overall reactive power reference, Qref_WPP, into individual reactive power setpoints, $Qset\_WTG_i$, according to the local voltage levels, $V\_WTG_i$, of the WTGs 14. In this manner, the overall reactive power reference, Qref_WPP, is satisfied whilst balancing the voltage levels between the WTGs 14.

For this purpose, the Q set point dispatcher 41 is further configured to receive the local voltage signals, $V\_WTG_i$, where each voltage signal, $V\_WTG_i$, is indicative of a local voltage level of a respective one of the WTGs 14. For example, each voltage signal, $V\_WTG_i$, may be derived from a time-varying series of voltage measurements obtained at the respective WTG 14. Such voltage measurements may, for example, be determined at respective terminals of a power converter of the WTG 14, and/or at a low or a high voltage side of a transformer that connects the WTG 14 to the wider WPP 12.

The Q set point dispatcher 41 is configured to use the individual voltage levels, $V\_WTG_i$, to determine an appropriate split or allocation of the overall reactive power reference value, Qref_WPP, amongst the WTGs 14. This is achieved, at least in part, by comparing each local voltage level, $V\_WTG_i$, to a reference voltage level, Vref_WTG, such as an average voltage level, based on the collection of local voltage levels, $V\_WTG_i$.

The Q set point dispatcher 41 may be configured to initially determine a reactive power reference value, $Qref\_WTG_i$, for each WTG 14 by nominally dividing or splitting the overall reactive power demand of the WPP 12, Qref_WPP, amongst the WTGs 14.

The invention is not intended to be particularly in respect of the nominal division of the overall reactive power demand, Qref_WPP, which may be determined according to a predetermined function, and may or may not provide a uniform distribution.

To give an example, the Q set point dispatcher 41 may be configured to initially divide the overall reactive power demand, Qref_WPP, equally amongst the WTGs 14 according to the equation:

$$Qref\_WTG_i = Qref\_WPP/N$$

where N is equal to the number of WTGs 14 that the reactive power demand is split between.

In other examples, the initial division may account for the available reactive power, $Qavail_i$, at each WTG 14 and the Q set point dispatcher 41 may therefore also receive signals, $Qavail_i$, from the local WTG controllers 15 in order to determine the nominal split of the overall Qref_WPP. Here, $Qavail_i$, is indicative of the available reactive power, i.e. that amount of reactive power that could currently be produced at maximum by the individual WTGs 14. In this manner, the overall, Qref_WPP, may be split up according to the abilities of the individual WTGs 14.

Thereafter, the Q set point dispatcher 41 may be configured to determine adjustments of the initial reactive power reference value, $Qref\_WTG_i$, based on the local voltage levels, $V\_WTG_i$, of the respective WTGs 14. For example, the Q set point dispatcher 41 may be configured to determine an adjustment for each WTG 14, based on the deviation of the local voltage level, $V\_WTG_i$, obtained from that WTG 14, from the reference voltage level, Vref_WTG. The reference voltage level, Vref_WTG, used for such comparison is advantageously based on the local voltage levels, $V\_WTG_i$, of the group of WTGs 14. The Q set point dispatcher 41 may therefore receive the local voltage signals, $V\_WTG_i$, for each WTG 14 and determine an average voltage level, based thereon, for use as the reference voltage level, Vref_WTG.

In order to determine the corresponding reactive power adjustments, the Q set point dispatcher 41 may include a droop controller (not shown) including one or more schemes, rules, or algorithms for droop control of the reactive power output of each WTG 14. The droop controller may, for example, include a droop coefficient, Droop, relating the change in reactive power to the deviation of the local voltage level, $V\_WTG_i$, from the reference voltage level, Vref_WTG. In particular, the reactive power adjustment may therefore be determined according to the following equation:

$$\Delta Q_i = (V_{ref\_WTG} - V\_WTG_i) \times \text{Droop}$$

where $\Delta Q_i$ is the reactive power adjustment for the i-th WTG 14, where i=1 to N and is a positive integer corresponding to the number of WTGs 14, $V_{REF\_WTG}$ is the reference voltage level, $V\_WTG_i$ is the indicated voltage level of the i-th WTG 14, and Droop is the droop coefficient of the droop control technique, for example having units of VAR/V.

In examples, the droop coefficient, Droop, may be such that a local voltage level deviation of 1 per unit (pu) produces a 0.05 pu reactive power adjustment. The droop coefficient, Droop, may be chosen as positive or negative. Moreover, in other examples, the droop coefficient, Droop, may be linked to the operating conditions and the droop controller may be configured to determine the droop coefficient, Droop, as a function of an electric-power parameter, such as a reactive power output, Q_WPP, of the WPP 12, or a voltage level, V_PoC, of the main grid 16. For example, the droop controller may include one or more control modules (not shown) configured to determine the droop coefficient based on a curve relating respective values of the droop coefficient and the electric-power parameter, such as the voltage level, V_PoC, of the main grid 16. For example, the curve may be selected from a plurality of such curves based on a control input, as may be provided from a grid or plant operator. In this manner, the droop coefficient is tuneable according to the operating conditions.

In each case, the droop controller is configured to use the same droop coefficient, Droop, for all of the WTGs 14 in order to ensure that the total sum of the outputs is zero.

The output of the droop controller is a reactive power adjustment, $\Delta Q_i$, for each WTG 14, which may be passed to a power limit block and/or a rate limiter block (not shown), before being combined with the initial reactive power reference value, $Qref\_WTG_i$. That is, additional logic, such as a limiter, or a rate limiter, can also be implemented to bound the determined variables, such as the reactive power adjustment, $\Delta Q_i$. The power limit block applies upper and lower power limits to the reactive power adjustment. The rate limiter block may further apply one or more rate of change limits to the determined reactive power adjustment, $\Delta Q_i$. Again, the WTG controller 15 may determine the rate of change limits based on a maximum permissible rate of change of reactive power of the WTG 14, as may be prescribed for a particular type of WTG for example.

The Q set point dispatcher 41 may therefore determine the reactive power set point, $Qset\_WTG_i$, for each WTG 14 by dividing the overall reactive power reference value, Qref_WPP, amongst the WTGs 14 to determine the initial reference values, $Qref\_WTG_i$, to which the reactive power adjustment, $\Delta Q_i$, are added. For example, each reactive power set point, $Qset\_WTG_i$, may therefore be determined according to the equation:

$$Qset\_WTG_i = (Qref\_WPP/N) + \Delta Qi = (Qref\_WTG_i) + \Delta Qi.$$

Here it shall be appreciated that the calculation is executed with capacitive reactive power having a positive sign, so that WTGs 14 with higher voltages will operate in a more inductive manner with positive droop coefficients.

In this manner, the Q set point dispatcher 41 is configured to adjust a nominal division of the overall, Qref_WPP, according to the local voltage levels, $V\_WTG_i$, of the individual WTGs 14 and output individual reactive power set points $Qset\_WTG_i$, for producing more balanced voltage levels amongst the WTGs 14. In this manner, the individual reactive power set points, $Qset\_WTG_i$, collectively ensure that the WTGs 14 satisfy the reactive power demand, Qref_WPP, of the WPP 12.

The local WTG controllers 15 comprise a local Q controller 45. The local Q controllers 45 receive the respective $Qset\_WTG_i$ values, dispatched from the PPC 22, as inputs and control the WTGs 14 accordingly to produce corresponding amounts of reactive power, for example in a feedback mode of operation.

In this manner, the WTGs 14 are controlled to satisfy the reactive power demand, Qref_WPP, of the WPP 12, whilst producing balanced voltage levels amongst the WTGs 14, which reduces power losses in the feeder systems and provides more capacity for responding to a low/high voltage grid fault.

Figure 3:
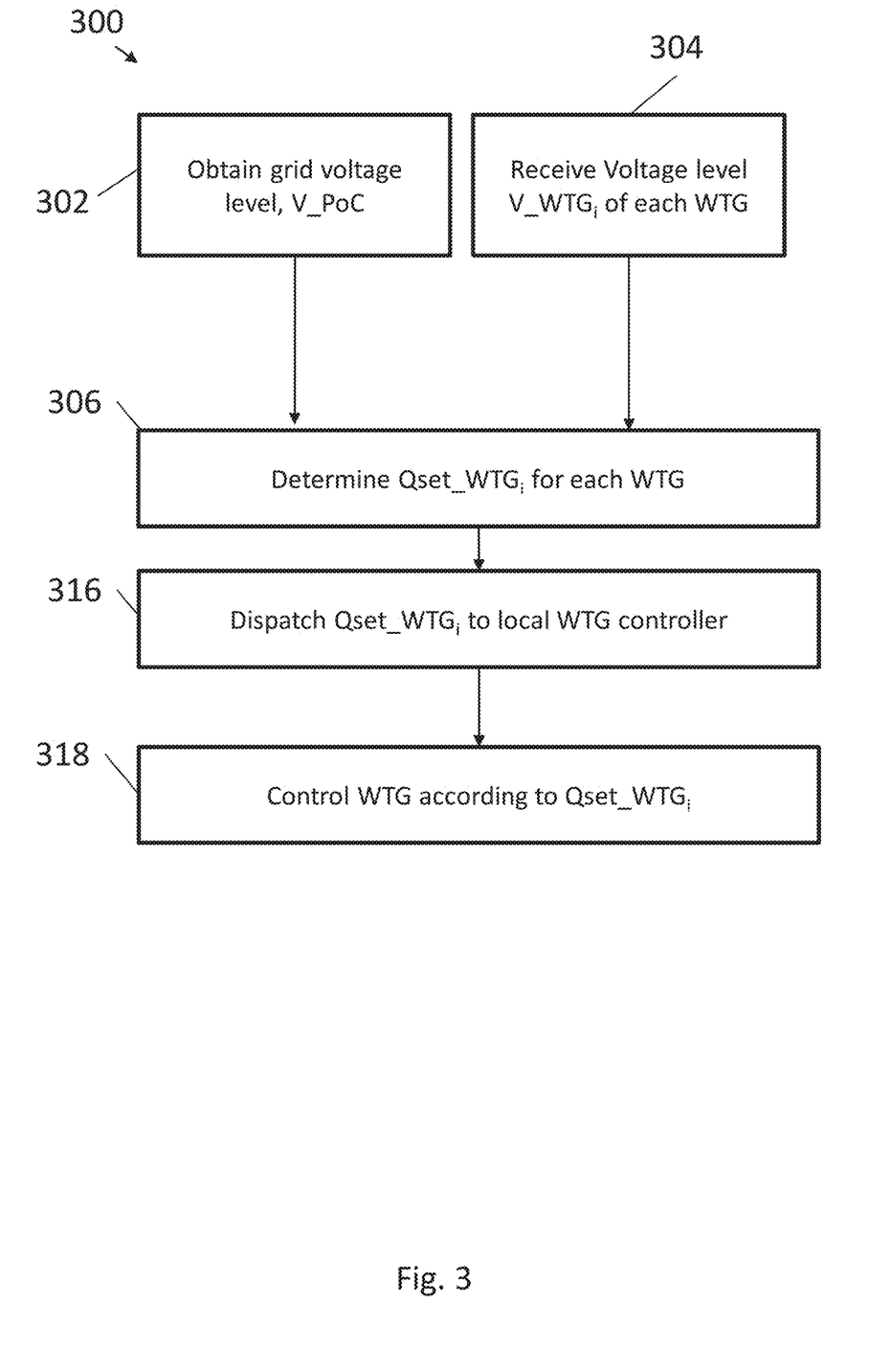
FIG. 3 shows an exemplary method of operating the renewable energy power plant of FIG. 1 in accordance with an embodiment of the invention.
Figure 4:
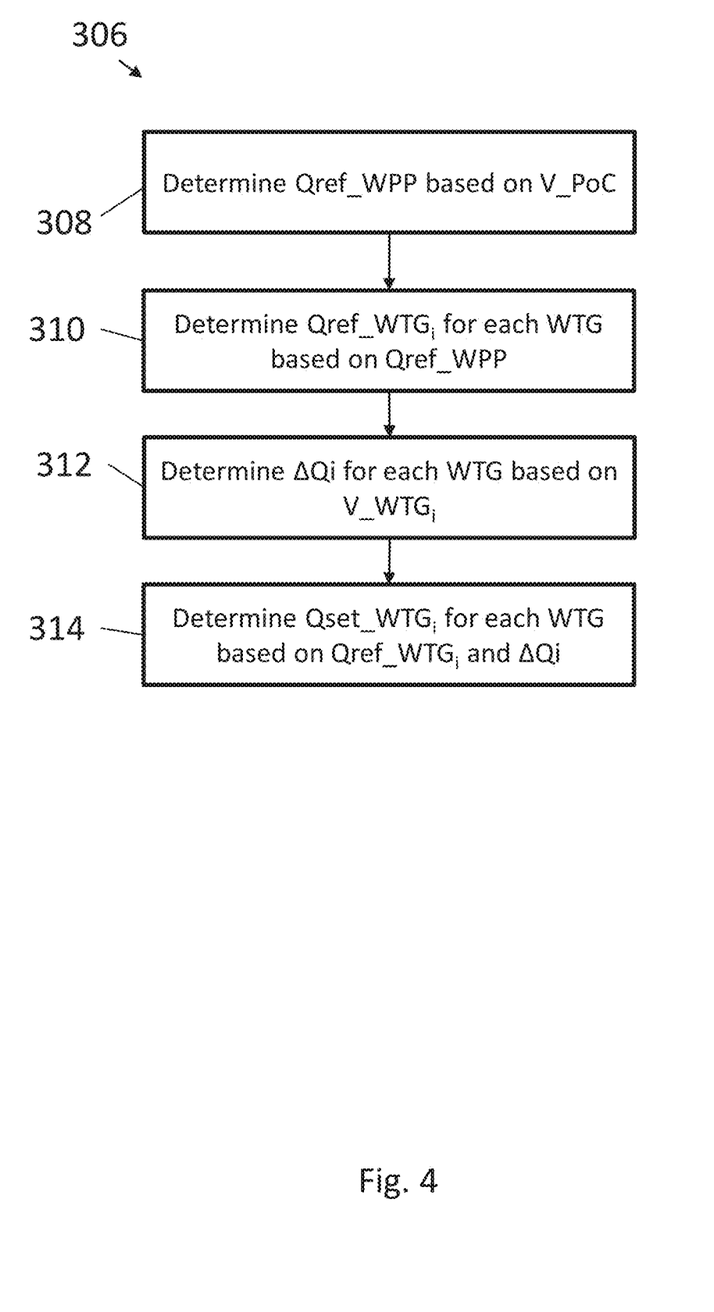
FIG. 4 shows exemplary sub-steps, in accordance with an embodiment of the invention, of the method shown in FIG. 3.

A method 300 of operating the WPP 12 in accordance with an embodiment of the invention shall now be described in more detail with additional reference to FIGS. 3 and 4.

In step 302, the PPC 22 obtains a voltage signal indicative of the voltage level, V_PoC, of the main grid 16. For example, the PPC 22 may receive or otherwise obtain a series of measurements, such as voltage measurements at the PoM 24, and derive the voltage signal, V_PoC, based thereon.

In parallel, in step 304, the PPC 22 receives a set of voltage signals that are indicative of the local voltage levels of the WTGs 14. That is, the PPC 22 receives a respective voltage signal, $V\_WTG_i$, for each WTG 14, collectively forming a set of local voltage signals. Each local voltage signal, $V\_WTG_i$, is indicative of the local voltage level at a respective one of the WTGs 14 and may be received from the respective WTG controllers 15, for example.

In step 306, the PPC 22 determines a reactive power set point, $Qset\_WTG_i$, for each WTG 14 based, principally, on the indicated voltage level, V_PoC, of the main grid 16 and the indicated local voltage levels, $V\_WTG_i$, of each of the WTGs 14. In this context, the indicated voltage level, V_PoC, of the main grid 16 is comparable to a reference voltage level for the main grid 16, such as a nominal voltage level. The difference or error can be used to determine a corresponding amount of reactive power for the WPP 12 to supply in order to mitigate such difference, and thereby support the power network in returning towards the nominal voltage level. For example, this may involve the use of a droop function or a lookup-table, stored in the PPC 22, relating values of the indicated grid voltage to respective reactive power values to support the grid 16. Meanwhile, the indicated local voltage levels, $V\_WTG_i$, of the WTGs 14 are comparable to one another for the PPC 22 to determine how to determine individualised reactive power set points, $Qset\_WTG_i$, for the WTGs 14, that will balance the loads whilst collectively consuming/injecting the required amount of reactive power to support the power network in returning towards the nominal voltage level.

The individual reactive power set points, $Qset\_WTG_i$, may therefore be determined by the PPC 22, in step 306, according to one or more schemes, rules, or methods. By way of example, FIG. 4 shows exemplary sub-steps of a method for determining the reactive power set point, $Qset\_WTG_i$, for each WTG 14, in step 306.

In sub-step 308, the PPC 22 may determine an overall reactive power reference value, $Qref\_WPP$, for the WPP 12 based on the voltage signal, $V\_PoC$. By way of example, the PPC 22 may use the deviation of the grid voltage signal, $V\_PoC$, from a reference voltage (such as a nominal grid voltage) to determine a corresponding reactive power demand to be consumed/injected by the WPP 12 (in order to support the grid 16) and input that reactive power value to a control loop for determining the overall reactive power reference value, $Qref\_WPP$, by comparison to one or more feedback measurements of the reactive power output from the PPC 22 to the WPP 12, $Qmeas\_WPP$. For example, the PPC 22 may use a droop function, look-up table, or Q-V curve, relating the deviation of the grid voltage signal, $V\_PoC$, from a reference voltage to a corresponding reactive power demand, and compare the reactive power demand to the measured reactive power output, $Qmeas\_WPP$, to determine the overall reactive power reference value, $Qref\_WPP$, for the WPP 12. Optionally, the control loops of the PPC 22 may also use the reactive power output from each of the WTGs 14, $Qmeas\_WTG_i$. In addition, the reactive power loops may receive reactive power reference values, Qref, or voltage reference values, Vref, from other Q-related control aspects.

The reactive power loop includes one or more schemes, rules, or algorithms for combining the various inputs and comparing the reactive power to the reactive power feedback measurements. On this basis, the reactive power loop determines the overall reactive power reference, $Qref\_WPP$, for the WPP 12, which may be provided to the Q set-point dispatcher 41.

In sub-step 310, the PPC 22 may split the overall reactive power reference value, $Qref\_WPP$ into initial reactive power reference values, $Qref\_WTG_i$, for each WTG 14.

For example, the Q setpoint dispatcher 41 may determine the individual reactive power reference values, $Qref\_WTG_i$, by dividing the overall reactive power reference value, $Qref\_WPP$, amongst the WTGs 14.

As discussed previously, the division may be achieved in a uniform manner by simply dividing the overall reactive power reference value, $Qref\_WPP$, equally amongst the WTGs 14 according to the equation:

$$Qref\_WTG_i = Qref\_WPP/N.$$

In other examples, although not shown, the Q set-point dispatcher 41 may receive $Qavail_i$ signals from the WTG controllers 15 and divide the overall reactive power reference value, $Qref\_WPP$, amongst the WTGs 14 accordingly, accounting for the available reactive power at each WTG 14.

In sub-step 312, the PPC 22 may determine a reactive power adjustment, $\Delta Qi$, for each WTG 14 based on the respective local voltage signal, $V\_WTG_i$. For each WTG 14, the reactive power adjustment, $\Delta Qi$, may be determined, in part, by comparing the indicated voltage level, $V\_WTG_i$, to a reference voltage level, $V_{ref\_WTG}$.

As mentioned previously, the reference voltage level, $V_{ref\_WTG}$, may itself be based on the set of voltage signals received in step 304. For example, the PPC 22 may be configured to determine the reference voltage level, $V_{ref\_WTG}$, based on an average, or another function, of the indicated local voltage levels, $V\_WTG_i$, in the received set of voltage signals.

Each reactive power adjustment, $\Delta Qi$, may subsequently be determined as a corresponding reactive power adjustment based on a comparison of the respective local voltage level, $V\_WTG_i$, to the reference voltage level, $V_{ref\_WTG}$. The PPC 22 may use one or more functions, look-up tables, and/or Q-V curves for this purpose, relating the local voltage deviation (from the average voltage level) to a respective reactive power adjustment, $\Delta Qi$.

To give one advantageous example, the PPC 22 may use a droop control function for this purpose, and determine each reactive power adjustment, $\Delta Qi$, according to the following equation:

$$\Delta Qi = (V_{REF\_WTG} - V\_WTG_i) \times \text{Droop}$$

Where $\Delta Q_i$ is the reactive power adjustment for the i-th WTG 14, where I=1 to N and is a positive integer corresponding to the number of WTGs 14, $V_{REF\_WTG}$ is the reference voltage level, $V\_WTG_i$ is the indicated voltage level of the i-th WTG 14, and Droop is the droop coefficient of the droop control technique. Here it shall be appreciated that the droop coefficient, Droop, may define a linear relationship between the local voltage deviations and the corresponding reactive power adjustments for each WTG 14.

In sub-step 314, the PPC may determine a reactive power set point, $Qset\_WTG_i$, for each WTG 14 based on the initial reactive power reference value $Qref\_WTG_i$, and the reactive power adjustment, $\Delta Q_i$, determined for each WTG 14.

For example, each reactive power set point, $Qset\_WTG_i$, may be determined by summing the initial reactive power reference value $Qref\_WTG_i$, and the reactive power adjustment, $\Delta Q_i$, determined for each WTG 14 together.

Returning to FIG. 3, once the PPC 22 has determined the reactive power set points, $Qset\_WTG_i$ for each WTG 14, the PPC 22 dispatches the determined reactive power set points, $Qset\_WTG_i$, in step 316, to the respective WTG controllers 15 for the WTGs 14.

In step 318, the WTG controllers 15 receive the dispatched signals containing the reactive power set points, $Qset\_WTG_i$, and control the WTGs 14 accordingly to produce corresponding amount of reactive power.

In this manner, more balanced voltage outputs are provided from the WTGs 14, reducing losses in the feeder systems, and providing more voltage headroom or capacity for improved control reliability in the event of a grid fault.

It will be appreciated that various changes and modifications can be made to the examples described above without departing from the scope of the present invention.

For example, the PPC 22 may be configured to selectively determine the reactive power set points, $Qset\_WTG_i$, for each WTG 14 based on the indicated voltage level, $V\_PoC$, of the main grid 16, in isolation, or additionally based on the indicated local voltage levels, $V\_WTG_i$, of each of the WTGs 14 in dependence on detecting one of a plurality of operating conditions of the WPP 12. For example, the PPC 22 may ordinarily be configured to determine an overall reactive power reference value, Qref_WPP, based on the indicated voltage level, V_PoC, of the main grid 16 and split determine individual reactive power set points, $Qset\_WTG_i$, for each WTG 14 by splitting the overall reactive power reference value, Qref_WPP, equally or in some other fashion amongst the WTGs 14. However, upon detecting one of a selection of operating conditions of the WPP 12, the PPC may be configured to determine the reactive power set points, $Qset\_WTG_i$, for each WTG 14 additionally based on the local voltage levels, $V\_WTG_i$, as described above. For example, such plant operating conditions may include: an active or reactive power output of the WPP 12 being greater than or equal to an upper power threshold; an active or reactive power output of the WPP 12 being less than or equal to a lower power threshold; the indicated voltage level, V_PoC, of the power network 16 being greater than or equal to an upper voltage threshold; and/or the indicated voltage level V_PoC, of the power network 16 being less than or equal to a lower voltage threshold.

In other examples, one or more limits may be applied to bound the determined reference voltage level, $V_{ref\_WTG}$, including an upper and/or lower voltage limit, and/or a rate limit for limiting a rate of change of the reference voltage level, $V_{ref\_WTG}$, in successive iterations.

In the above examples, it shall be appreciated that the local voltage levels, $V\_WTG_i$, of the WTGs 14 may, for example, be a route mean square (RMS) voltage or a different representation of the voltage magnitude, such as the voltage in the rotating reference frame. Additionally and/or alternatively, such voltage signals may be filtered with different bandwidths and with different kinds of filters and signal processing techniques (e.g. dq transformation). The filters can be applied in the WTGs 14, in the PPC 22, in a different unit in the communication channel, and/or in any such combination.

The invention claimed is:

1. A power plant controller for a renewable energy power plant comprising a plurality of renewable energy generators, the renewable energy power plant being connected to a power network, the power plant controller being configured to execute machine readable instructions to:
   receive a signal indicative of a voltage level of the power network to which the power plant is connected;
   receive a plurality of signals from the plurality of renewable energy generators, each signal being indicative of a voltage level of a respective renewable energy generator; and
   determine, for each of the plurality of renewable energy generators, a respective reactive power set point by:
      determining a reactive power reference value for that renewable energy generator based on an indicated voltage level of the power network;
      determining a reactive power adjustment value for that renewable energy generator based on a difference between an indicated voltage level of that renewable energy generator and a reference voltage level determined based on indicated voltage levels of the plurality of renewable energy generators;
      determining the reactive power set point for that renewable energy generator based on the reactive power reference value and the reactive power adjustment value, determined for that renewable energy generator; and
      dispatch each determined reactive power set point to a respective local controller associated with the respective renewable energy generator for controlling that renewable energy generator.

2. The power plant controller according to claim 1, wherein the reactive power adjustment value is determined for each renewable energy generator using a droop control technique.

3. The power plant controller according to claim 2, wherein the reactive power adjustment value is determined using the equation:

$$\Delta Q_i = (V_{REF\_WTG} - V\_WTG_i) \times \text{Droop}$$

where $\Delta Q_i$ is the reactive power adjustment value for the i-th renewable energy generator, i=1 to N, where N is a positive integer corresponding to the number of renewable energy generators in the power plant, $V_{REF\_WTG}$ is the reference voltage level, $V\_WTG_i$ is the indicated voltage level of the i-th renewable energy generator, and Droop is a droop coefficient of the droop control technique.

4. The power plant controller according to claim 3, wherein the power plant controller is configured to determine the droop coefficient for the plurality of renewable energy generators as a function of an electric-power parameter of the renewable energy power plant.

5. The power plant controller according to claim 1, wherein the power plant controller is configured to limit each determined reactive power adjustment value using an upper power limit and/or a lower power limit.

6. The power plant controller according to claim 1, wherein the power plant controller is configured to limit a rate of change of the determined reactive power adjustment value using a rate of change limit.

7. The power plant controller according to claim 1, wherein the reactive power reference value is determined for each renewable energy generator by:
   determining a reactive power reference value for the renewable energy power plant based on the indicated voltage level of the power network; and
   dividing that reactive power reference value amongst the plurality of renewable energy generators to determine an individual reactive power reference value for each renewable energy generator.

8. The power plant controller according to claim 1, wherein the reference voltage level is determined as an average voltage level of the indicated voltage levels of the plurality of renewable energy generators.

9. The power plant controller according to claim 1, wherein the power plant controller is configured to limit the reference voltage level using an upper voltage limit and/or a lower voltage limit.

10. The power plant controller according to claim 1, wherein the power plant controller is configured to limit a rate of change of the reference voltage level using a rate of change limit.

11. The power plant controller according to claim 1, wherein the plurality of signals received from the plurality of renewable energy generators are each indicative of the voltage level of the respective renewable energy generator at one or more of:
   a low voltage side of a transformer of the renewable energy generator, the transformer connecting the renewable energy generator to the power plant;
   a high voltage side of the transformer; and/or
   at respective terminals of a power converter of the renewable energy generator.

12. The power plant controller according to claim 1, wherein the power plant controller is configured to determine each reactive power set point based, at least in part, on the reference voltage level and the indicated voltage level of the respective renewable energy generator, in dependence on detecting one of a plurality of plant operating conditions.

13. The power plant controller according to claim 12, wherein the plurality of plant operating conditions include:
- an active power output of the power plant being greater than or equal to an upper active power threshold;
- an active power output of the power plant being less than or equal to a lower active power threshold;
- the indicated voltage level of the power network being greater than or equal to an upper voltage threshold; and/or
- the indicated voltage level of the power network being less than or equal to a lower voltage threshold.

14. A method of operating a renewable energy power plant connected to a power network, the renewable energy power plant comprising a plurality of renewable energy generators, the method comprising:
- obtaining a signal indicative of a voltage level of the power network to which the power plant is connected;
- obtaining a plurality of signals from the plurality of renewable energy generators, each signal being indicative of a voltage level of a respective renewable energy generator; and
- determining, for each of the plurality of renewable energy generators, a respective reactive power set point by:
  - determining a reactive power reference value for that renewable energy generator based on an indicated voltage level of the power network;
  - determining a reactive power adjustment value for that renewable energy generator based on a difference between an indicated voltage level of that renewable energy generator and a reference voltage level determined based on indicated voltage levels of the plurality of renewable energy generators;
  - determining the reactive power set point for that renewable energy generator based on the reactive power reference value and the reactive power adjustment value, determined for that renewable energy generator; and
- dispatching that determined reactive power set point from a power plant controller to a local controller associated with that renewable energy generator for controlling the renewable energy generator.

* * * * *